(12) United States Patent
Yasui

(10) Patent No.: US 11,600,078 B2
(45) Date of Patent: Mar. 7, 2023

(54) INFORMATION PROCESSING APPARATUS, INFORMATION PROCESSING METHOD, VEHICLE, INFORMATION PROCESSING SERVER, AND STORAGE MEDIUM

(71) Applicant: HONDA MOTOR CO., LTD., Tokyo (JP)

(72) Inventor: Yuji Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 201 days.

(21) Appl. No.: 17/198,773

(22) Filed: Mar. 11, 2021

(65) Prior Publication Data

US 2021/0295063 A1    Sep. 23, 2021

(30) Foreign Application Priority Data

Mar. 19, 2020  (JP) .............................. JP2020-049397

(51) Int. Cl.
*G06V 20/58* (2022.01)
*G06K 9/62* (2022.01)
*G06N 3/08* (2023.01)

(52) U.S. Cl.
CPC .......... *G06V 20/58* (2022.01); *G06K 9/6257* (2013.01); *G06K 9/6262* (2013.01); *G06N 3/08* (2013.01)

(58) Field of Classification Search
CPC ................. G06V 20/58; G06V 10/764; G06V 10/7747; G06V 10/803; G06V 10/82; G06K 9/6257; G06K 9/6262; G06K 9/6289; G06N 3/08; G06N 3/0454

USPC ......................................................... 382/103
See application file for complete search history.

(56) References Cited

U.S. PATENT DOCUMENTS

| | | | | |
|---|---|---|---|---|
| 2015/0036920 A1* | 2/2015 | Wu | ...................... | G06K 9/6267 382/156 |
| 2015/0117760 A1* | 4/2015 | Wang | ................... | G06V 10/454 382/157 |
| 2020/0160494 A1* | 5/2020 | Hwang | .................... | G06N 3/08 |
| 2022/0180202 A1* | 6/2022 | Yin | ...................... | G06N 3/0454 |

FOREIGN PATENT DOCUMENTS

| | | |
|---|---|---|
| JP | 2018-527660 A | 9/2018 |
| WO | 2017/015887 A1 | 2/2017 |

* cited by examiner

*Primary Examiner* — Juan A Torres
(74) *Attorney, Agent, or Firm* — WHDA, LLP

(57) ABSTRACT

An information processing apparatus recognizes a target within an actual image by executing processing of a neural network. The information processing apparatus obtains intermediate outputs which correspond to the actual image and a computer graphics (CG) image and which are from a hidden layer when each of the actual image and the CG image has been separately input to the neural network, and causes the neural network to perform learning with use of an evaluation values based on a first evaluation function and a second evaluation function, the first evaluation function causing the evaluation value to decrease as a difference between a recognition result and training data decreases, the second evaluation function causing the evaluation value to decrease as a difference between the intermediate outputs corresponding to the actual image and the CG image decreases.

14 Claims, 7 Drawing Sheets

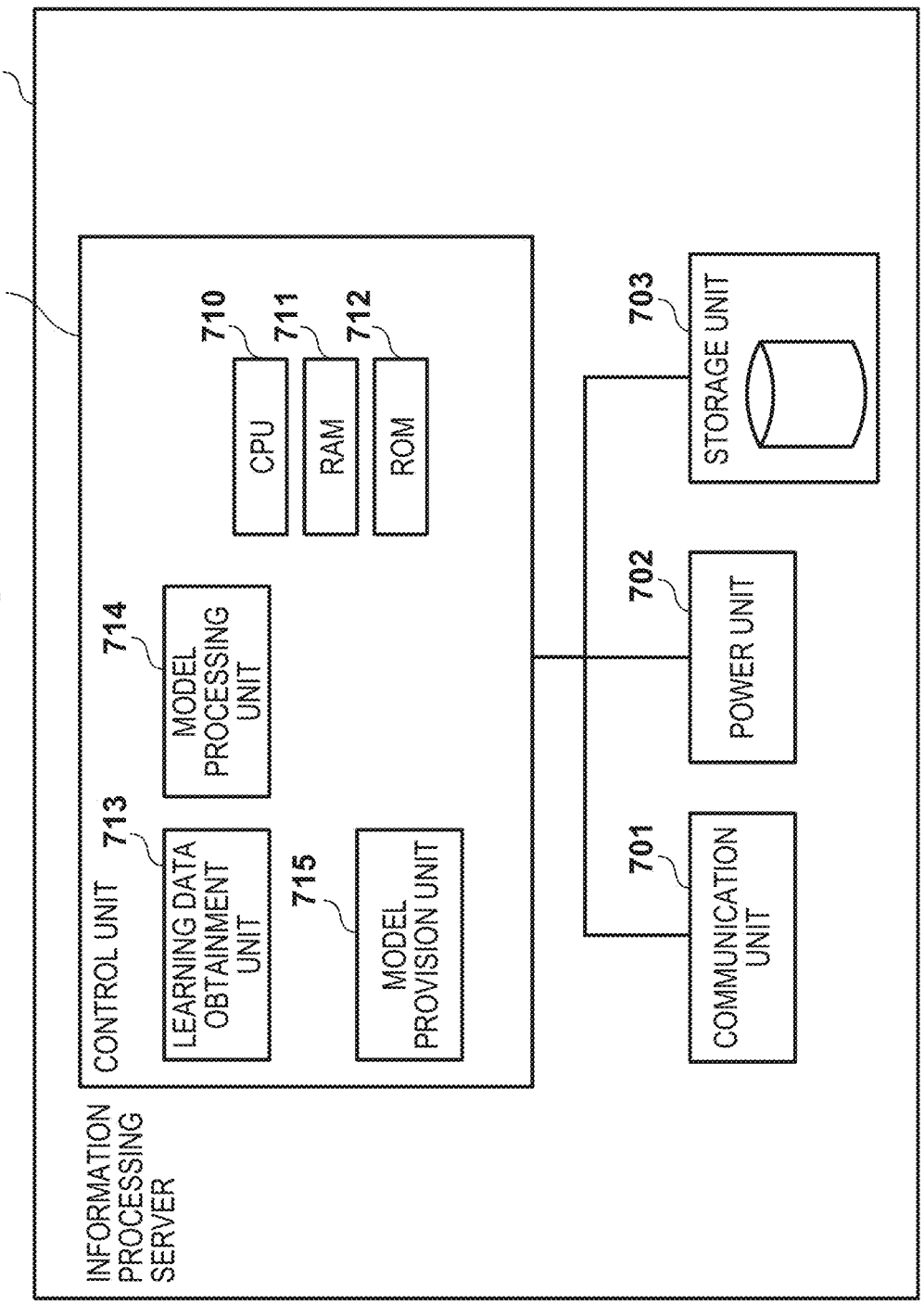

INFORMATION PROCESSING APPARATUS, INFORMATION PROCESSING METHOD, VEHICLE, INFORMATION PROCESSING SERVER, AND STORAGE MEDIUM

CROSS-REFERENCE TO RELATED APPLICATION(S)

This application claims priority to and the benefit of Japanese Patent Application No. 2020-049397 filed on Mar. 19, 2020, the entire disclosure of which is incorporated herein by reference.

BACKGROUND OF THE INVENTION

Field of the Invention

The present invention relates to an information processing apparatus, an information processing method, a vehicle, an information processing server, and a storage medium.

Description of the Related Art

In recent years, there is a known technique in which an image shot by a camera mounted on a vehicle is input to a neural network, and object recognition (also called object detection) is performed through estimation processing of the neural network (Japanese Patent Laid-Open No. 2018-527660).

Meanwhile, there is demand for, in a case where object recognition processing is performed using a shot image and the behaviors of a vehicle are controlled based on the result of such object recognition processing, a robust recognition result be achieved in a variety of situations that can occur while the vehicle is traveling. On the other hand, because it is difficult to secure, as learning data, images that have captured all kinds of situations, there is a case where CG images rendered with computer graphics (CG) are used as learning data.

There is a case where an actually shot image (also referred to as an actual image) and a CG differ from each other in image characteristics depending on the degrees of enhancement in edge portions, and on noise and changes in shades in portions without edges, even if the actually shot image and the CG image show the same scene in which objects and backgrounds are similarly arranged.

Therefore, if a learning model performs learning using a CG image as learning data with respect to a scene which occurs at an extremely low frequency and for which an actual image corresponding to the situation of the scene is difficult to obtain, there is a risk that an equal recognition result cannot be achieved by estimation processing that have actually used an actual image.

Japanese Patent Laid-Open No. 2018-527660 discloses the execution of monochromatic conversion and contrast adjustment as pre-processing for object recognition processing in order to achieve a more robust recognition result, but does not take into consideration the use of a CG image as learning data and the problem therewith.

SUMMARY OF THE INVENTION

The present disclosure has been made in consideration of the aforementioned issues, and realizes a technique in which, in a case where a learning model that outputs an inference result with respect to an input image is used, the robustness of an inference result with respect to an actual image can be increased even in a case where a CG image is used as learning data.

In order to solve the aforementioned problems, one aspect of the present disclosure provides an information processing apparatus comprising: one or more processors; and a memory storing instructions which, when the instructions are executed by the one or more processors, cause the information processing apparatus to function as: an obtainment unit configured to obtain an actual image shot by an image capturing device; a recognition unit configured to recognize a target within the actual image by executing processing of a neural network that includes a hidden layer; and a processing unit configured to cause the neural network to perform learning by changing weighting coefficients for the neural network so that evaluation values based on a first evaluation function and a second evaluation function decrease, wherein the processing unit obtains intermediate outputs which correspond to the actual image and a computer graphics (CG) image and which are from the hidden layer of the neural network when each of the actual image and the CG image has been separately input to the neural network, the CG image showing a scene similar to the actual image, and the processing unit causes the neural network to perform learning with use of the evaluation values based on the first evaluation function and the second evaluation function, the first evaluation function causing the evaluation value to decrease as a difference between a recognition result from the recognition unit and training data decreases, the second evaluation function causing the evaluation value to decrease as a difference between the intermediate outputs corresponding to the actual image and the CG image decreases.

Another aspect of the present disclosure provides, a vehicle including an information processing apparatus, the information processing apparatus including: one or more processors; and a memory storing instructions which, when the instructions are executed by the one or more processors, cause the information processing apparatus to function as: an obtainment unit configured to obtain an actual image shot by an image capturing device; a recognition unit configured to recognize a target within the actual image by executing processing of a neural network that includes a hidden layer; and a processing unit configured to cause the neural network to perform learning by changing weighting coefficients for the neural network so that evaluation values based on a first evaluation function and a second evaluation function decrease, wherein the processing unit obtains intermediate outputs which correspond to the actual image and a computer graphics (CG) image and which are from the hidden layer of the neural network when each of the actual image and the CG image has been separately input to the neural network, the CG image showing a scene similar to the actual image, and the processing unit causes the neural network to perform learning with use of the evaluation values based on the first evaluation function and the second evaluation function, the first evaluation function causing the evaluation value to decrease as a difference between a recognition result from the recognition unit and training data decreases, the second evaluation function causing the evaluation value to decrease as a difference between the intermediate outputs corresponding to the actual image and the CG image decreases.

Still another aspect of the present disclosure provides, a vehicle comprising: an image capturing device; one or more processors; and a memory storing instructions which, when the instructions are executed by the one or more processors, cause the vehicle to function as: a recognition unit configured to recognize a target within an actual image shot by the image capturing device by executing processing of a neural network including a hidden layer, wherein the neural network is provided by an information processing server that includes a processing device configured to cause the neural network to perform learning by changing weighting coefficients for the neural network so that evaluation values based on a first evaluation function and a second evaluation function decrease, the information processing server causes the processing device to obtain intermediate outputs which correspond to the actual image and a computer graphics (CG) image and which are from the hidden layer of the neural network when each of the actual image and the CG image has been separately input to the neural network, the CG image showing a scene similar to the actual image, and the processing device causes the neural network to perform learning with use of the evaluation values based on the first evaluation function and the second evaluation function, the first evaluation function causing the evaluation value to decrease as a difference between a recognition result from the recognition unit and training data decreases, the second evaluation function causing the evaluation value to decrease as a difference between the intermediate outputs corresponding to the actual image and the CG image decreases.

Yet Still another aspect of the present disclosure provides, an information processing server comprising: one or more processors; and a memory storing instructions which, when the instructions are executed by the one or more processors, cause the information processing server to function as: an obtainment unit configured to obtain, from an external information processing apparatus, an actual image shot by an image capturing device included in the external information processing apparatus; a recognition unit configured to recognize a target within the actual image by executing processing of a neural network that includes a hidden layer; and a processing unit configured to cause the neural network to perform learning by changing weighting coefficients for the neural network so that evaluation values based on a first evaluation function and a second evaluation function decrease, wherein the processing unit obtains intermediate outputs which correspond to the actual image and a computer graphics (CG) image and which are from the hidden layer of the neural network when each of the actual image and the CG image has been separately input to the neural network, the CG image showing a scene similar to the actual image, and the processing unit causes the neural network to perform learning with use of the evaluation values based on the first evaluation function and the second evaluation function, the first evaluation function causing the evaluation value to decrease as a difference between a recognition result from the recognition unit and training data decreases, the second evaluation function causing the evaluation value to decrease as a difference between the intermediate outputs corresponding to the actual image and the CG image decreases.

Still yet another aspect of the present disclosure provides, an information processing method that is executed by an information processing apparatus comprising: one or more processors; and a memory storing instructions which, when the instructions are executed by the one or more processors, cause the information processing apparatus to function as: an obtainment unit configured to obtain an actual image shot by an image capturing unit; a recognition unit configured to recognize a target within the actual image by executing processing of a neural network that includes a hidden layer; and a processing unit, the information processing method comprising: causing the neural network to perform learning by changing weighting coefficients for the neural network so that evaluation values based on a first evaluation function and a second evaluation function decrease, wherein, in the causing, intermediate outputs are obtained which correspond to the actual image and a computer graphics (CG) image and which are from the hidden layer of the neural network when each of the actual image and the CG image has been separately input to the neural network, the CG image showing a scene similar to the actual image, and in the causing, the neural network is caused to perform learning with use of the evaluation values based on the first evaluation function and the second evaluation function, the first evaluation function causing the evaluation value to decrease as a difference between a recognition result from the recognition unit and training data decreases, the second evaluation function causing the evaluation value to decrease as a difference between the intermediate outputs corresponding to the actual image and the CG image decreases.

Yet still another aspect of the present disclosure provides, an information processing method that is executed by an information processing server comprising: one or more processors; and a memory storing instructions which, when the instructions are executed by the one or more processors, cause the information processing server to function as: an obtainment unit configured to obtain, from an external information processing apparatus, an actual image shot by an image capturing device included in the external information processing apparatus; a recognition unit configured to recognize a target within the actual image by executing processing of a neural network that includes a hidden layer; and a processing unit, the information processing method comprising: causing the neural network to perform learning by changing weighting coefficients for the neural network so that evaluation values based on a first evaluation function and a second evaluation function decrease, wherein, in the causing, intermediate outputs are obtained which correspond to the actual image and a computer graphics (CG) image and which are from the hidden layer of the neural network when each of the actual image and the CG image has been separately input to the neural network, the CG image showing a scene similar to the actual image, and in the causing, the neural network is caused to perform learning with use of the evaluation values based on the first evaluation function and the second evaluation function, the first evaluation function causing the evaluation value to decrease as a difference between a recognition result from the recognition unit and training data decreases, the second evaluation function causing the evaluation value to decrease as a difference between the intermediate outputs corresponding to the actual image and the CG image decreases.

Still yet another aspect of the present disclosure provides, a non-transitory computer-readable storage medium storing instructions for causing a computer to function as each unit of an image processing apparatus, the image processing apparatus including: one or more processors; and a memory storing instructions which, when the instructions are executed by the one or more processors, cause the information processing apparatus to function as: an obtainment unit configured to obtain an actual image shot by an image capturing device; a recognition unit configured to recognize a target within the actual image by executing processing of a neural network that includes a hidden layer; and a processing unit configured to cause the neural network to perform learning by changing weighting coefficients for the neural network so that evaluation values based on a first evaluation function and a second evaluation function decrease, wherein the processing unit obtains intermediate outputs which correspond to the actual image and a computer graphics (CG) image and which are from the hidden layer of the neural network when each of the actual image and the CG image has been separately input to the neural network, the CG image showing a scene similar to the actual image, and the processing unit causes the neural network to perform learning with use of the evaluation values based on the first evaluation function and the second evaluation function, the first evaluation function causing the evaluation value to decrease as a difference between a recognition result from the recognition unit and training data decreases, the second evaluation function causing the evaluation value to decrease as a difference between the intermediate outputs corresponding to the actual image and the CG image decreases.

According to the present invention, in a case where a learning model that outputs an inference result with respect to an input image is used, the robustness of an inference result with respect to an actual image can be increased even in a case where a CG image is used as learning data.

BRIEF DESCRIPTION OF THE DRAWINGS

FIG. 7 is a block diagram showing an exemplary functional configuration of an information processing server according to a second embodiment.

DESCRIPTION OF THE EMBODIMENTS

Figure 1:
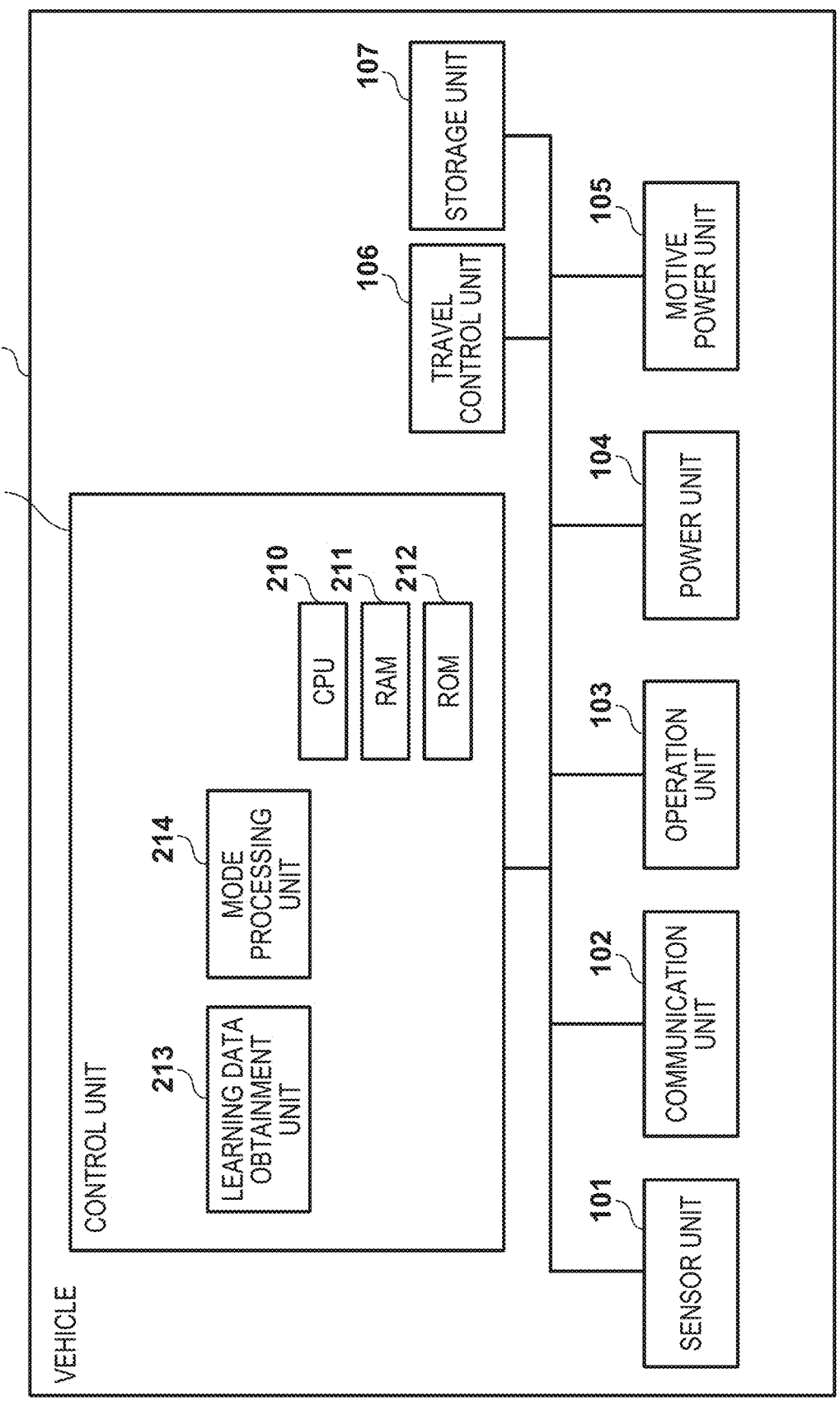
FIG. 1 is a block diagram showing an exemplary functional configuration of a vehicle according to a first embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

Furthermore, although the following description will be given using an exemplary case where a control unit 200 is a control unit built in a vehicle 100, the vehicle 100 may be equipped with an information processing apparatus that includes the constituents of the control unit 200. That is to say, the vehicle 100 may be a vehicle equipped with an information processing apparatus that includes such constituents as a CPU 210 and a model processing unit 214 included in the control unit 200.

<Configuration of Vehicle>

First, an exemplary functional configuration of the vehicle 100 according to the present embodiment will be described with reference to FIG. 1. Note that respective functional blocks that will be described below with reference to the drawings may be integrated together or divided, and the described functions of each block may be realized by another block. Furthermore, what is described as hardware may be realized as software, and vice versa.

A sensor unit 101 includes a camera (image capturing unit) that outputs a shot image obtained by shooting the front (and further the rear direction and the surroundings) of the vehicle. The sensor unit 101 may further include Lidar (Light Detection and Ranging) that outputs a distance image obtained by measuring a distance in front of (and further in the rear direction and the surroundings of) the vehicle. The shot actual image is used in, for example, predetermined inference processing performed by the control unit 200 for vehicle control, including object recognition, travel road recognition, scene recognition, and recognition of the behaviors of traffic participants. Furthermore, various types of sensors that output the acceleration, position information, steering angle, and the like of the vehicle 100 may be included.

A communication unit 102 is, for example, a communication device including a communication circuit and the like, and communicates with an external information processing server, a traffic system therearound, and the like via mobile communication that has been standardized as, for example, LTE, LTE-Advanced, and the like, or so-called 5G. A part or an entirety of map data can be received from the external information processing server, and traffic information and the like can be received from another traffic system.

An operation unit 103 includes such operation members as buttons and a touchscreen installed inside the vehicle 100, and also includes such members as a steering wheel and a brake pedal that accept an input for driving the vehicle 100. A power unit 104 includes, for example, a battery composed of a lithium-ion battery and the like, and supplies electric power to respective components inside the vehicle 100. A motive power unit 105 includes, for example, an engine and a motor that generate motive power for causing the vehicle to travel.

Based on the result of inference processing (e.g., the result of object recognition) output from the control unit 200, a travel control unit 106 controls traveling of the vehicle 100 so as to, for example, keep traveling in the same lane or follow a vehicle ahead while traveling. Note, in the present embodiment, this travel control can be performed using a known method. Also note, although the travel control unit 106 is exemplarily shown as a constituent different from the control unit 200 in the description of the present embodiment, it may be included in the control unit 200.

A storage unit 107 includes a nonvolatile, large-capacity storage device, such as a semiconductor memory. The storage unit 107 temporarily stores an actual image output from the sensor unit 101, and additionally, various types of sensor data output from the sensor unit 101. The storage unit 107 also stores learning data (a CG image and training data) which has been received by a later-described learning data obtainment unit 213 from, for example, the external information processing server via the communication unit 102, and which is to be used in learning of the model processing unit 214.

The control unit 200 includes, for example, a CPU 210, a RAM 211, and a ROM 212, and controls the operations of respective components of the vehicle 100. Furthermore, the control unit 200 obtains an actual image from the sensor unit 101, and executes the aforementioned, predetermined inference processing including object recognition processing and the like. In the control unit 200, the CPU 210 deploys a computer program stored in the ROM 212 to the RAM 211 and executes the computer program; as a result, the functions of respective components included in the control unit 200, such as the model processing unit 214, are exerted.

The CPU 210 includes one or more processors. The RAM 211 is composed of, for example, a volatile storage medium, such as a DRAM, and functions as a working memory for the CPU 210. The ROM 212 is composed of a nonvolatile storage medium, and stores the computer program executed by the CPU 210, setting values that are used in causing the control unit 200 to operate, and so forth. Note, although the embodiments will be described hereinafter using an exemplary case where the CPU 210 executes processing of the model processing unit 214, processing of the model processing unit 214 may be executed by one or more other non-illustrated processors (e.g., GPUs).

The learning data obtainment unit 213 obtains an actual image output from the sensor unit 101, as well as a CG image and training data from the external information processing server, and stores them as learning data into the storage unit 107. The learning data is used in causing the model processing unit 214 to perform learning in a learning stage.

The model processing unit 214 performs inference processing with respect to an image by, for example, performing computation of a deep learning algorithm that uses a neural network, which is a machine learning algorithm. The following description will be provided using an exemplary case where the model processing unit 214 recognizes targets within an image by performing object recognition processing with respect to the image. The targets include pedestrians, vehicles, two-wheeled vehicles, billboards, signs, roads, on-road lines that are drawn in white or yellow, and the like included within the image. Note, in the following description, targets may be simply referred to as, for example, objects.

In the present embodiment, the neural network is composed of, for example, an input layer, hidden layers made up of a plurality of layers, and an output layer; for example, neurons in each layer are connected to neighboring neurons. For ease of understanding, the present embodiment will be described using an exemplary case where neurons in each layer are fully interconnected. However, the neural network according to the present invention may compose a CNN (Convolutional Neural Network) that includes one or more convolutional layers, pooling layers, and fully connected layers. Also, the network structure of the neural network is not limited to the foregoing examples, and may adopt another configuration. Furthermore, the network structure may adopt a configuration that further includes skip connections, as with a ResNet (Residual Network). Alternatively, for example, the network structure may further adopt a decoder configuration in addition to an encoder configuration, as with an auto encoder. It goes without saying that the network structure is not limited to the foregoing structures, and may be another structure as long as it is a neural network structure that is used for spatially distributed signals of, for example, images.

<Main Configuration for Controlling Traveling of Vehicle>

Figure 2:
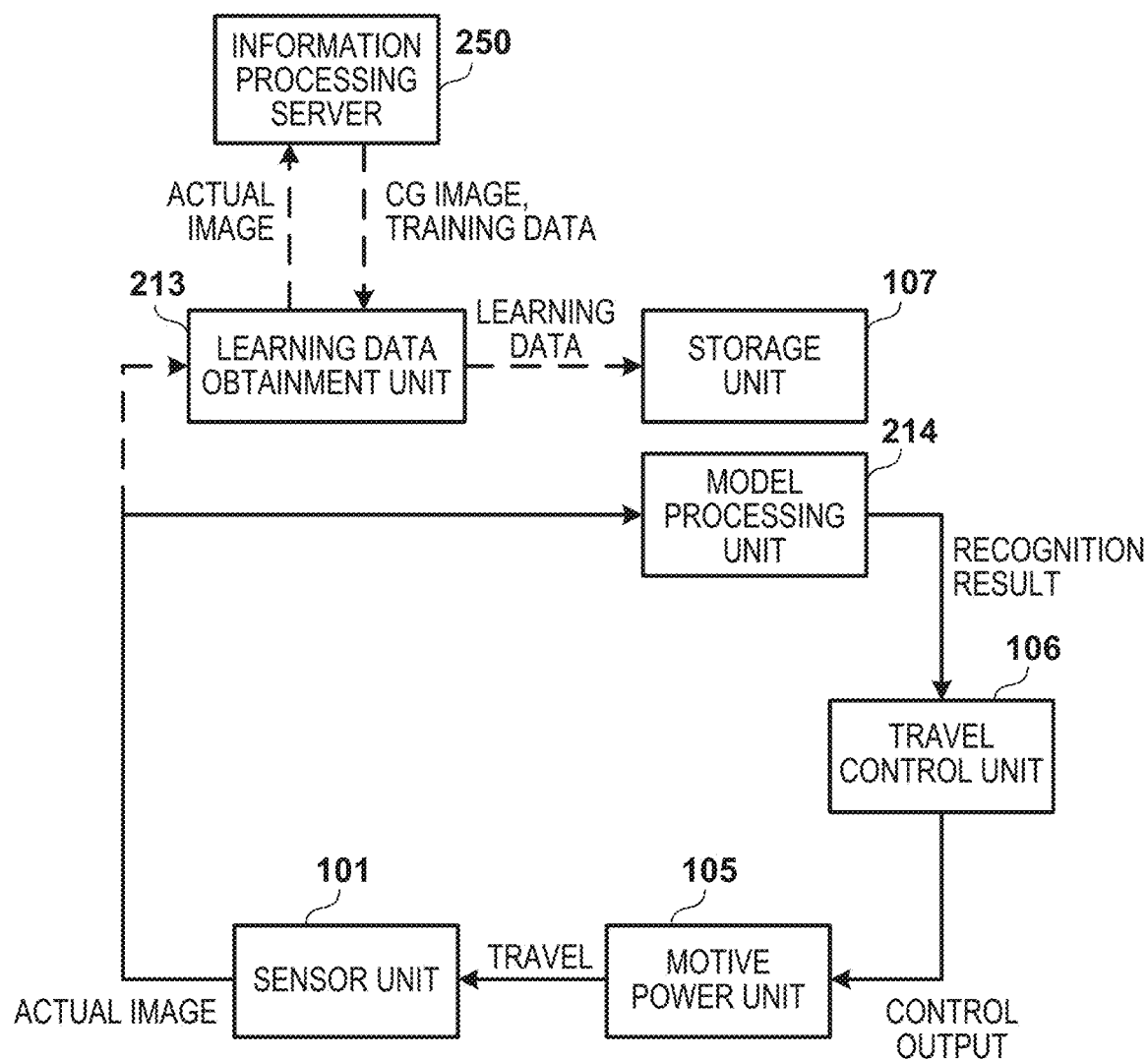
FIG. 2 is a diagram illustrating a main configuration for controlling traveling of the vehicle according to the first embodiment.

Next, a main configuration for controlling traveling of the vehicle 100 will be described with reference to FIG. 2. The sensor unit 101, for example, shoots the front of the vehicle 100, and outputs a predetermined number of shot actual images per second. An actual image output from the sensor unit 101 is input to each of the model processing unit 214 and the learning data obtainment unit 213 of the control unit 200. The actual image input to the model processing unit 214 is used in object recognition processing for controlling traveling of the vehicle at present. On the other hand, the actual image input to the learning data obtainment unit 213 is used to obtain learning data, with which a learning model of the model processing unit 214 performs learning, at a predetermined timing that coincides with or follows the input.

The model processing unit 214 receives, as an input, the actual image output from the sensor unit 101, executes object recognition processing with respect to the actual image, and outputs the recognition result to the travel control unit 106. Although the recognition result will be described later, for example, information indicating whether there is an object, the position and size of the recognized object region, the type of the recognized object, and so forth is output for each of the grids obtained by dividing the input image.

The travel control unit 106 performs vehicle control for the vehicle 100 by, for example, outputting a control signal to the motive power unit 105 based on the result of object recognition and on various types of sensor information obtained from the sensor unit 101, such as the acceleration and steering angle of the vehicle. As vehicle control performed by the travel control unit 106 can be performed using a known method as stated earlier, the details thereof are omitted in the present embodiment. The motive power unit 105 controls generation of motive power in accordance with the control signal from the travel control unit 106.

The learning data obtainment unit 213 transmits the input actual image to, for example, an external information processing server 250, and obtains, from the information processing server 250, a CG image showing the same scene as the transmitted actual image and training data including an annotation for the image (the actual image and/or the CG image). Also, the CG image and the training data obtained from the information processing server 250 may include a scene that does not correspond to any actual image. That is to say, the learning data obtainment unit 213 can obtain, from the external information processing server 250, a CG image as a CG-reproduced image corresponding to a rare case for which no actual image exists, as well as corresponding training data.

The learning data obtainment unit 213 stores the obtained actual image and training data, as well as CG image and training data, into the storage unit 107 as learning data. At this time, the learning data obtainment unit 213 renders the actual image and the CG image showing the same scene identifiable by, for example, using the image file names that are partially the same.

<Exemplary Configuration of Neural Network, and Exemplary Processing of Learning Stage, of Model Processing Unit>

Figure 3:
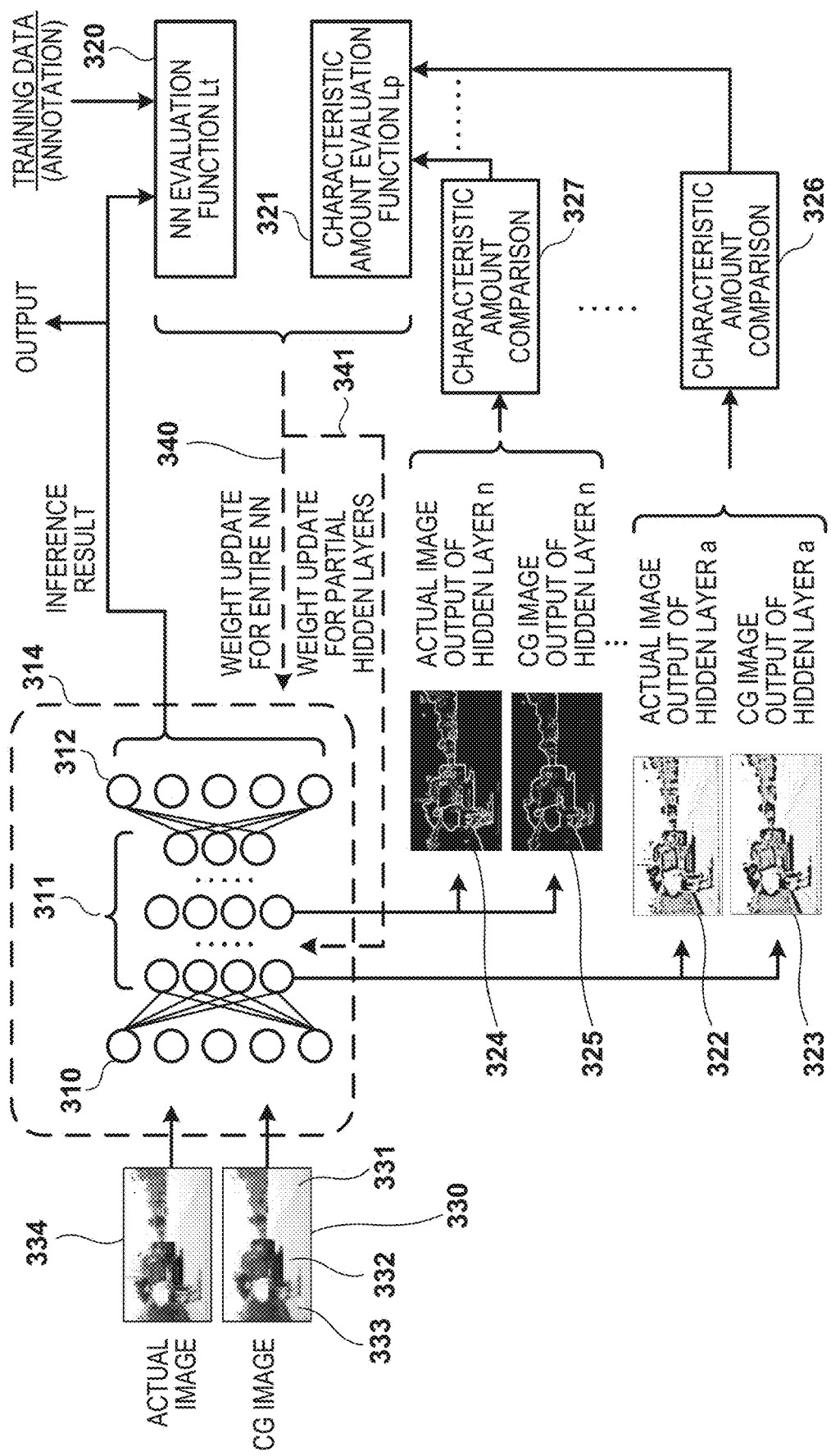
FIG. 3 is a diagram illustrating an exemplary configuration of a neural network (NN) of a model processing unit and exemplary processing of a learning stage of the NN according to the first embodiment.

Next, with reference to FIG. 3, a description is given of an exemplary configuration of the neural network, and exemplary processing of the learning stage, of the model processing unit 214.

The learning model used by the model processing unit 214 is composed of, for example, a neural network 314 having a plurality of hidden layers, which is called a deep neural network and mainly includes an input layer 310, hidden layers 311, and an output layer 312. One actual image or one CG image is input to the input layer 310, and pixel values of the image are input to neurons of the input layer 310.

A CG image 330 and an actual image 334 shown in FIG. 3 are schematic representations of a CG image and an actual image which show the same scene and which have been obtained by shooting the front of the vehicle. The CG image 330 and the actual image 334 both show the existence of a line 331 located at the center of the road, as well as a first subject 332 (e.g., a vehicle) and a second subject 333 (e.g., a two-wheeled vehicle) ahead of the vehicle 100.

The input layer 310 includes, for example, neurons that correspond in number to the image size of the actual image (or CG image)×3 ch. Signals input from the input layer 310 are sequentially propagated from the input layer toward the output layer. As stated earlier, the hidden layers 311 are configured to be, for example, fully connected layers that are connected to all neurons in neighboring layers. However, the hidden layers 311 may adopt another configuration, such as a CNN configuration that includes a convolutional layer, a pooling layer, and a fully connected layer, for example.

Figure 4:
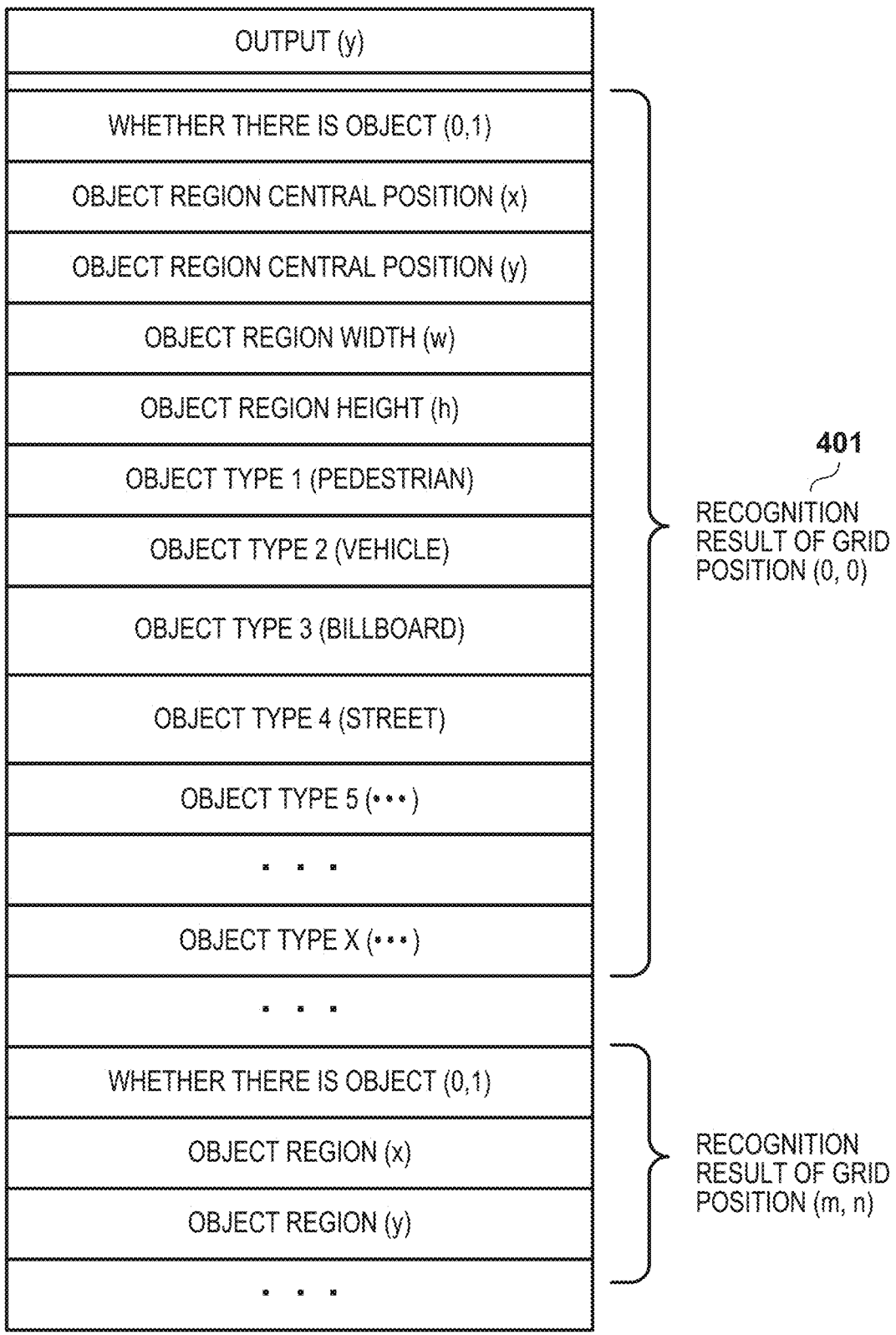
FIG. 4 is a diagram showing an exemplary output from the model processing unit according to the first embodiment.

The output layer 312 is composed of a number of neurons that output data shown in FIG. 4 whereby the actual image is divided into a plurality of grids (e.g., 19×19) and each grid stores the recognition result. FIG. 4 shows an example in which the recognition result is output on a grid-by-grid basis as an exemplary output of the recognition result obtained through object recognition processing performed by the model processing unit 214.

A recognition result 401 is an exemplary output for storing the recognition result for, for example, a grid position (0, 0), that is to say, an upper-left grid of the image. Whether there is an object (e.g., 1 is set in a case where the object exists, and 0 is set in a case where the object does not exist), as well as the central position and the size of an object region, in this grid is output. Furthermore, regarding object types, for example, in a case where a pedestrian has been recognized, 1 is set as the value of an object type (pedestrian) for which the existence of the object has been recognized, and 0 is set as the values of other object types for which the existence of the object has not been identified. Output values of object types may be output as the probabilities at which respective objects exist.

Next, a description is given of the processing of the learning stage of the neural network according to the present embodiment. Through the processing of the learning stage according to the present embodiment, the neural network performs learning so as to enable inference processing with respect to an image, and in addition, the influence of the differences between an actual image and a CG image on the inference result from the neural network is reduced.

First, the model processing unit 214 calculates output values of the learning model. For example, the model processing unit 214 calculates an output value y(m, q)(k) from the $q^{th}$ neuron of the $m^{th}$ layer in the neural network 314 in accordance with the following expressions of (1) and (2). By performing this calculation in sequence from the input layer 310, to which signal values of an image are input, to the output layer, an output from the output layer 312 can be obtained. The output (y) is in the form of FIG. 4, for example.

[Expression 1]

$$v_{(m,q)}(k) = \sum_{i=1}^{Q_{m-1}} w_{(m,q)(i)}(h) \times y_{(m-1,i)}(k-1) \quad (1)$$

[Expression 2]

$$y_{(m,q)}(k) = F(v_{(m,q)}(h)) \quad (2)$$

Here, each sign in the expressions is as follows.

$y_{(m, q)}(\ )$: an output from the $q^{th}$ neuron of the $m^{th}$ layer $y_{(m-1, i)}(\ )$: an output from the $i^{th}$ neuron of the $(m-1)^{th}$ layer $v_{(m, q)}(\ )$: an intermediate value (a sum of an input and a weight) from the $q^{th}$ neuron of the $m^{th}$ layer $y_{(m, q)(i)}$: a weighting coefficient for an output from the $i^{th}$ neuron of the $(m-1)^{th}$ layer relative to the $q^{th}$ neuron of the $m^{th}$ layer $Q_{m-1}$: the total number of neurons of the $(m-1)^{th}$ layer F: an activating function (a ReLU function, a sigmoid function, etc.)

k: a computation timing in the forward direction of the neural network h: an updating timing for a weighting coefficient The model processing unit 214 calculates an evaluation value using an evaluation function $L_t$ for the entire NN (an NN evaluation function 320). The calculation of the output (y) is performed as many times as there are pieces of learning data, and the evaluation value using the NN evaluation function $L_t$ is calculated based on the differences between respective outputs and training data. The NN evaluation function $L_t$ causes the evaluation value to decrease as the differences between the recognition results and the training data decrease. This function is, for example, a function that obtains the square values of the differences between the recognition results for respective pieces of learning data and the training data, and adds as many square values as there are pieces of learning data.

Also, as shown in FIG. 3, the model processing unit 214 extracts characteristic amounts from image signals (intermediate outputs 322 and 324) output from predetermined layers included among the hidden layers (hereinafter referred to as partial hidden layers), and calculates an evaluation value using a characteristic amount evaluation function $L_p$ (a characteristic amount evaluation function 321). In order to obtain this characteristic amount evaluation function $L_p$, the model processing unit 214 first obtains intermediate outputs 322, 324 of the actual image, which are obtained from the outputs from the hidden layers in a case where the actual image 334 has been input to the neural network. Next, intermediate outputs 323, 325 of the CG image, which are obtained from the outputs from the same hidden layers in a case where the CG image 330 has been input, are obtained. That is to say, intermediate outputs pertaining to a case where each of the actual image and the CG image is separately input to the neural network 314 are obtained. Then, the characteristic amounts of the intermediate outputs obtained from the same hidden layer are extracted and compared with each other. Although the details of the characteristic amount evaluation function will be described later, the characteristic amount evaluation function is an evaluation function that causes the evaluation value to decrease as the difference between the intermediate outputs corresponding to the actual image and the CG image decreases.

The model processing unit 214 executes the calculation of the evaluation value using the characteristic amount evaluation function $L_p$ in a case where, for example, the pair of the actual image 334 and the CG image 330 showing the same scene are sequentially input as learning data. For example, using a corresponding images determination unit, which is not shown, the model processing unit 214 identifies the actual image and the CG image that correspond to each other from learning data input to the neural network (based on, for example, file names and the like). Then, the model processing unit 214 performs characteristic amount comparisons 326 and 327 with use of intermediate outputs for the corresponding images. In this way, using the characteristic amount evaluation function $L_p$ for taking into consideration the differences between the actual image and the CG image, the model processing unit 214 reflects the corresponding evaluation value related to the characteristic amounts in the update of the weighting coefficients based on the NN evaluation function $L_t$. This reduces the influence of the difference between the corresponding actual image and CG image on the accuracy of inference of the neural network.

More specifically, the update of the weighting coefficients for the neural network in the present embodiment is calculated in accordance with expressions (3) and (4) based on a weight update 340 for the entire NN and a weight update 341 for the partial hidden layers. That is to say, learning of the neural network in the present embodiment is performed as the weighting coefficients for the neural network are changed so that the evaluation values based on the NN evaluation function $L_t$ and the characteristic amount evaluation function $L_p$ decrease.

[Expression 3]

Partial hidden layer:

$$w_{(m,q)(i)}(h) = w_{(m,q)(i)}(h-1) + wsc(h) \times \Delta w_{p(m,q)}(h) + (1-wsc(h)) \times \Delta w_{t(m,q)}(h) \quad (3)$$

[Expression 4]

Layer other than partial hidden layer:

$$w_{(m,q)(i)}(h) = w_{(m,q)(i)}(h-1) + \Delta w_{t(m,q)}(h) \quad (4)$$

Here, each sign in the expressions is as follows.

$\Delta w_{t(m, q)}(\ )$: an update amount of each weighting coefficient based on the NN evaluation function $L_t$ $\Delta w_{p(m, q)}(\ )$: an update amount of each weighting coefficient based on the characteristic amount evaluation function $L_p$ wsc: a learning progress coefficient (which approaches 0 from near 1 in accordance with the progress of the learning stage)

The use of the learning progress coefficient wsc in expression (3) means that the neural network performs learning with use of an evaluation value obtained as a weighted sum of the evaluation value based on the NN evaluation function $L_t$ and the evaluation value based on the characteristic amount evaluation function $L_p$. This learning progress coefficient wsc is, for example, set to be near 1 in the initial phase of the learning stage, and its value decreases to 0 in accordance with the progress of learning (e.g., with an increase in the number of times the weighting coefficients have been updated in learning (the number of epochs)). However, the method of changing the learning progress coefficient is not limited to this example, and its value may decrease to 0 at the same time as convergence of learning based on the characteristic amount evaluation function $L_p$.

As described above, according to expression (3), the weighting coefficients for the partial hidden layers are updated based on the update amount of each weighting coefficient based on the NN evaluation function $L_t$ and the update amount of each weighting coefficient based on the characteristic amount evaluation function $L_p$. Therefore, as a result of reducing the learning progress coefficient from 1 to 0, learning for reducing the influence of the differences between the CG image and the actual image is executed preferentially during the first half of the learning stage.

The characteristic amount evaluation function $L_p$ can be calculated in accordance with the following expression.

[Expression 5]

$$\Delta P_j(h) = P_j(h) - P_{target,j}(h) \quad (1 \leq j \leq J) \quad (5)$$

[Expression 6]

$$L_p(h) = \sum_{j=1}^{J} w_{(p)(j)} \times \Delta P_j(h) \quad (6)$$

Here, each sign in the expressions is as follows.

J denotes the total number of characteristic amounts to be extracted, and may be a preset value. In general, in the CG image, edge portions based on luminance or RGB values are intense, and regions other than the edge portions exhibit small noise and changes in shades compared to the actual image. Therefore, Pj( ) denotes a characteristic amount related to a position, a region size, a variation amount, and a variation cycle of a low-frequency component based on luminance or RGB values within an image represented by an intermediate output, or related to an appearance frequency of a high-frequency component. That is to say, with regard to a position, a region size, a variation amount, and a variation cycle of a low-frequency component based on luminance or RGB values within an image, it is possible to extract characteristics indicating, for example, the extent to which the same luminance continues, and the extents of a variation range and a variation cycle of luminance or a color in a region that is formed by the same luminance or color information. On the other hand, with regard to an appearance frequency of a high-frequency component, it is possible to extract characteristics indicating, for example, the existence frequency of an edge or a spike of luminance or a color within an image. Furthermore, $\Delta Pj(\ )$ denotes a characteristic amount deviation between a characteristic amount of an intermediate output based on the actual image and a characteristic amount of an intermediate output based on the CG image.

$P_{target,j}(\ )$ denotes a target value of $P_j(\ )$. For example, $P_j(\ )$ of a case where learning of the learning model has been performed in advance using only the CG or actual image is calculated, and a value obtained by performing statistical processing with respect to the calculated $P_j(\ )$ is set. Alternatively, even in a case where learning has been performed using both of the CG image and the actual image, a value calculated by performing statistical processing only with respect to $P_j(\ )$ of a case where the CG image or the actual image has been input is set. As $P_{target,j}(\ )$ calculated using the CG image or the actual image, either $P_{target,j}(\ )$ calculated using the CG image or $P_{target,j}(\ )$ calculated using the actual image may be used.

$w_{(p)(j)}$ is a preset weighting coefficient for adjusting the degree of contribution of $\Delta P_j(\ )$, and indicates which characteristic amount is to exert the influence, as well as the extent of the influence, for each characteristic amount extracted. It may be determined adaptively in the learning stage of the learning model.

<Sequence of Operations in Processing of Learning Stage of Model Processing Unit>

Figure 5:
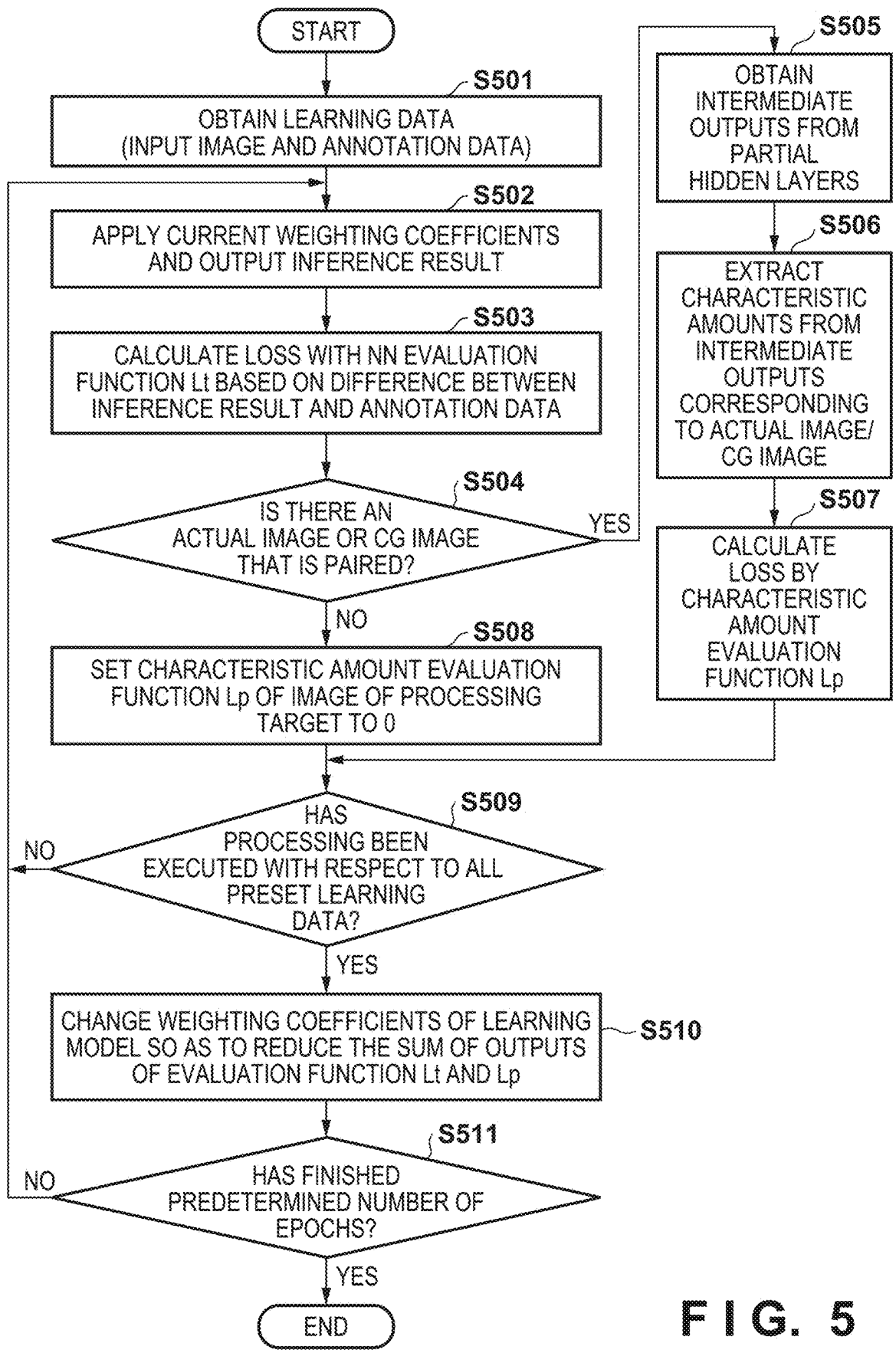
FIG. 5 is a flowchart showing a sequence of operations in the processing of the learning stage of the model processing unit according to the first embodiment.

Next, with reference to FIG. 5, a description is given of a sequence of operations in the learning stage of the model processing unit 214. Note that the present processing is realized as the CPU 210 of the control unit 200 deploys the program stored in the ROM 212 to the RAM 211 and executes the program. Also note that the neural network of the model processing unit 214 in the control unit 200 has not learned yet, and the present processing will place it in a state where it has learned. Furthermore, it is assumed that learning data transmitted from the external information processing server is stored in the storage unit 107 of the vehicle 100, and the control unit 200 uses predetermined learning data included in the stored learning data in learning of the present processing. At this time, in a case where there is a CG image that shows the same scene as an actual image, the correspondence therebetween can be identified based on, for example, file names of the learning data. It is therefore assumed that the model processing unit 214 has, in advance, determined file names of all pieces of learning data to be used in the present processing, and specified pairs of an actual image and a CG image for which characteristic amounts are to be extracted using intermediate outputs from actual images and CG images.

In step S501, the control unit 200 obtains learning data from the storage unit 107. Here, the learning data is data in which an actual image that has been actually shot from the vehicle and training data (an annotation) are set as a pair, or data in which a CG image and an annotation are set as a pair. An annotation is data describing whether there is an object and the position thereof within the actual image or the CG image, and indicates a correct answer that has been provided manually (or by a computer). The format of annotation data may be the same as that of the grid-by-grid recognition result illustrated in FIG. 4; for example, it is sufficient that annotation data describes whether there is an object, the central position of an object region, the size of the object region, and the type of the object (1 is appended to the relevant object type, and 0 is appended to other object types).

In step S502, the model processing unit 214 applies the current weighting coefficients of the neural network to the input image, which is the learning data, and outputs an inference result. That is to say, the model processing unit 214 executes computation of the neural network in accordance with the aforementioned expressions (1) and (2). At this time, output values from respective neurons in the hidden layers are temporarily stored into the RAM 211.

In step S503, based on the differences between the inference result and the annotation data included in the learning data, the model processing unit 214 calculates a loss (an evaluation value) with use of the NN evaluation function $L_t$. For example, in a case where the NN evaluation function $L_t$ is a function for calculating the sum of the squares of the differences (prediction errors) between the estimation result and the annotation, an output to be calculated by this function is calculated.

In step S504, the model processing unit 214 determines whether there is an actual image or a CG image that is paired with the image that has been input as the learning data. It is sufficient that this determination be made based on pairs of an actual image and a CG image for which characteristic amounts are to be extracted using intermediate outputs and which have been determined in advance from file names of learning data. In a case where the model processing unit 214 determines that there is an actual image or CG image that is paired, processing proceeds to step S505; otherwise, processing proceeds to step S508. In a case where processing proceeds to step S505, it is possible to not only advance learning for realizing inference processing with use of the actual image and the CG image, but also advance learning for reducing the differences between the CG image and the actual image. On the other hand, in a case where processing proceeds to step S508, it is possible to, for example, perform learning for inference processing that uses a rare-case CG image which cannot be obtained through actual traveling of the vehicle (i.e., there is no corresponding actual image).

In step S505, the model processing unit 214 obtains intermediate outputs from the partial hidden layers. For example, the model processing unit 214 obtains intermediate outputs (e.g., 322 to 345) by reading out the output values of the hidden layers that were temporarily stored into the RAM 211 in step S502.

In step S506, the model processing unit 214 calculates characteristic amounts (i.e., $P_j$) from the intermediate outputs corresponding to the actual image and the CG image. Furthermore, in step S507, the model processing unit 214 calculates an evaluation value (a loss) with use of the characteristic amount evaluation function $L_p$ in accordance with, for example, expressions (5) and (6).

On the other hand, in step S508, as the loss based on the characteristic amount evaluation function $L_p$ is not calculated using the pair of the actual image and the CG image, the model processing unit 214 sets 0 as the value of the characteristic amount evaluation function $L_p$ (with respect to the image serving as a processing target).

In step S509, the model processing unit 214 determines whether the outputs of the evaluation functions have been calculated using all of preset data samples included in the learning data. In a case where processing has been executed with respect to all of the preset data samples included in the learning data, the model processing unit 214 determines that processing for one epoch has finished, and processing proceeds to step S510. Otherwise, the model processing unit 214 causes processing to return to step S502 in order to perform processing with respect to the next input image.

In step S510, the model processing unit 214 changes the weighting coefficients for the learning model so as to reduce the sum of the outputs of the evaluation functions $L_t$ and $L_p$. That is to say, the model processing unit 214 changes the weighting coefficients sequentially, from the output layer toward the input layer, in accordance with the aforementioned expressions (3) and (4).

In step S511, the model processing unit 214 determines whether processing for a predetermined number of epochs has finished. That is to say, whether processing of steps S502 to S510 has been repeated a preset number of times is determined. By repeating processing of steps S502 to S510, the weighting coefficients for the neural network are changed so that they gradually converge on optimal values. In a case where the model processing unit 214 determines that processing for the predetermined number of epochs has not finished, processing returns to step S502; otherwise, the present processing sequence is ended. In this way, upon completion of the sequence of operations in the learning stage of the model processing unit 214, the neural network of the model processing unit 214 is placed in a state where it has learned.

<Sequence of Operations in Inference Stage of Model Processing Unit>

Figure 6:
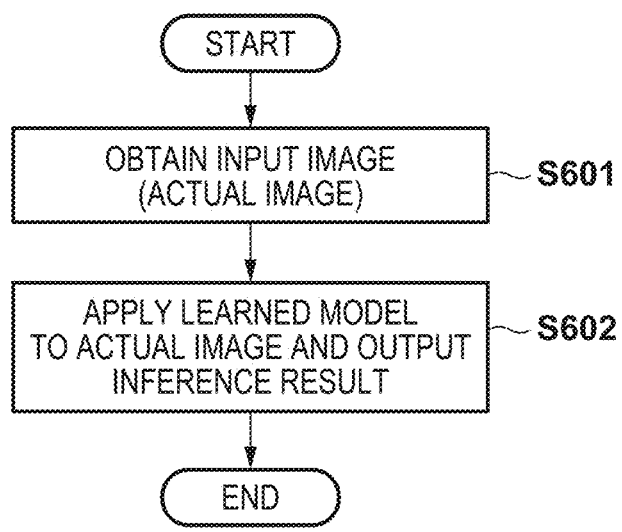
FIG. 6 is a flowchart showing a sequence of operations in processing of an estimation stage of the model processing unit according to the first embodiment.

Next, with reference to FIG. 6, a description is given of a sequence of operations in an estimation stage of the model processing unit 214. The present processing is processing for inferring, for example, a type of a target object and a position of the object by performing object recognition processing with respect to an actual image that has been actually shot from the vehicle 100 (an unknown image with no correct answer). Note that the present processing is realized as the CPU 210 of the control unit 200 deploys the program stored in the ROM 212 to the RAM 211 and executes the program. Also, in the present processing, the neural network of the model processing unit 214 is in a state where it has learned in advance (i.e., the weighting coefficients among neurons have been determined).

In step S601, the control unit 200 obtains an actual image output from the sensor unit 101. In step S602, the model processing unit 214 executes processing for recognizing a target within the image by applying the model that has learned to the actual image, and outputs the inference result obtained through the processing (in the form shown in FIG. 4). When the estimation processing has finished, the control unit 200 ends the sequence of operations pertaining to the present processing.

Note that the description of the foregoing embodiment has been given using an exemplary case where the weighting coefficients for specific hidden layers are changed based on the differences among intermediate outputs corresponding to an actual image and a CG image. However, the weighting coefficients for the entire neural network may be changed so as to reduce the differences among intermediate outputs corresponding to an actual image and a CG image (e.g., with use of evaluation values based on both evaluation functions, as with expression (3)). This, too, can at least render the inference result from the neural network robust against the differences between an actual image and a CG image.

Furthermore, the description of the foregoing embodiment has been given using an exemplary case where an actual image and a CG image show the same scene. However, the foregoing embodiment is also applicable to a case where an actual image and a CG image do not necessarily show the same scene, but show similar scenes, as long as there are similarities between the images in terms of the attribute of a recognition target and scenery. For example, in a case where an actual image and a CG image are a pair of scenes in which vehicles are present in an urban area, the positions of the vehicles and the backgrounds may vary. Also, in a case where an actual image and a CG image are a pair of scenes in which trucks and passenger vehicles are present on a highway, the lane width of the highway may vary, and the vehicle models of the trucks and the vehicle models of the passenger vehicles may vary. Furthermore, in a case where an actual image and a CG image are a pair of scenes in which pedestrians are present on sidewalks at both ends of a road of a shopping street, the width of the road, the width of the sidewalks, and the number, clothes, and locations of the pedestrians may vary.

As described above, according to the present embodiment, intermediate outputs are obtained with respect to each of an actual image and a CG image when the actual image and the CG image have been input to the neural network, and the neural network performs learning so as to reduce the differences among the characteristic amounts that appear in the intermediate outputs corresponding to the images. In this way, in a case where a learning model that outputs an inference result with respect to an input image is used, the robustness of an inference result with respect to an actual image can be increased even in a case where a CG image is used as learning data.

Second Embodiment

Next, a second embodiment of the present invention will be described. The foregoing embodiment has been described using an exemplary case where the processing of the learning stage of the neural network is executed on the vehicle 100. However, the present embodiment is applicable not only to a case where the processing of the learning stage is executed on the vehicle, but also to a case where the processing is executed on the information processing server. That is to say, a CG image and a training data provided by the information processing server 250 may be input to a learning model provided inside the information processing server, and a neural network may perform learning on the information processing server. Then, information related to the neural network that has learned (that is to say, the learned weighting coefficients) may be transmitted to the vehicle 100. The following describes an exemplary functional configuration of the information processing server according to such an embodiment.

<Configuration of Information Processing Server>

Next, an exemplary functional configuration of an information processing server will be described with reference to FIG. 7. Note that respective functional blocks that will be described below with reference to the drawings may be integrated together or divided, and the described functions of each block may be realized by another block. Furthermore, what is described as hardware may be realized as software, and vice versa.

A control unit 704 includes, for example, a CPU 710, a RAM 711, and a ROM 712, and controls the operations of respective components of an information processing server 700. In the control unit 704, the CPU 710 deploys a computer program stored in the ROM 712 to the RAM 711 and executes the computer program; as a result, the functions of respective components that make up the control unit 704 are exerted.

A learning data obtainment unit 713 stores an actual image transmitted from the vehicle 100 into a storage unit 703, and also stores, into the storage unit 703, a CG image and training data that have been generated, for example, by a predetermined user or by a computer using a predetermined method. Then, learning data is obtained from the storage unit 703 in a case where a model processing unit 714 executes processing of a learning stage of a learning model.

The model processing unit 714 may include, for example, constituents similar to those of the model processing unit 214. That is to say, the model processing unit 714 has a learning model that performs inference processing with respect to an image by performing calculation of a deep learning algorithm that uses a neural network. The learning model has, for example, a structure similar to that of the neural network that has been described with reference to FIG. 3, and with regard to the processing of the learning stage, the learning model is placed in a state where it has learned by performing the processing described above using FIG. 3 and FIG. 5.

A communication unit 701 is, for example, a communication device including a communication circuit and the like, and communicates with the vehicle 100 via a network, such as the Internet. The communication unit 701 receives an actual image transmitted from the vehicle 100, and transmits information of the model that has learned to the vehicle 100 at a predetermined timing or in predetermined cycles. A power unit 702 supplies electric power to each component inside the information processing server 700. The storage unit 703 is a nonvolatile memory, such as a hard disk and a semiconductor memory. The storage unit 703 stores the aforementioned learning data.

Note, as an alternative to the execution of the processing of the inference stage of the learning model on the vehicle 100, the information processing server 700 may execute, by itself, the model that has learned on the server side, and transmit the inference result to the vehicle 100.

A model provision unit 715 transmits, to the vehicle 100, information of the model that has learned on the information processing server 700 through processing similar to steps S501 to S511. Upon receiving the updated information of the model that has learned, the vehicle 100 updates the version of the learning model of the model processing unit 214. This information of the model that has learned includes, for example, version information of this learning model and information of the learned weighting coefficients of the neural network.

As the information processing server can use more abundant calculation resources and more easily collect learning data (including CG images) in a wide variety of situations than the vehicle, the information processing server can perform learning in correspondence with a larger number of situations. Therefore, the ability to provide the vehicle 100 with the model that has learned using learning data collected in the server, can increase the robustness of estimation with respect to images on the vehicle.

OTHER EMBODIMENTS

Note that the foregoing embodiments have been described using an exemplary case where the control unit 200 or the control unit 704 first performs learning with use of a CG image and an actual image, and then executes inference processing with use of the actual image. However, the foregoing embodiments are also applicable to a case where other processing pertaining to image recognition processing is implemented.

SUMMARY OF EMBODIMENTS

1. An information processing apparatus (e.g., 100) according to the foregoing embodiments includes:
   one or more processors; and
   a memory storing instructions which, when the instructions are executed by the one or more processors, cause the information processing apparatus to function as:
   an obtainment unit (e.g., 213) configured to obtain an actual image shot by an image capturing device;
   a recognition unit (e.g., 214, steps S502 and S602) configured to recognize a target within the actual image by executing processing of a neural network that includes a hidden layer; and
   a processing unit (e.g., 214, step S510) configured to cause the neural network to perform learning by changing weighting coefficients for the neural network so that evaluation values based on a first evaluation function and a second evaluation function decrease,
   wherein the processing unit obtains intermediate outputs (e.g., 322 to 325) which correspond to the actual image and a computer graphics (CG) image and which are from the hidden layer of the neural network when each of the actual image and the CG image has been separately input to the neural network, the CG image showing a scene similar to the actual image, and
   the processing unit causes the neural network to perform learning with use of the evaluation values based on the first evaluation function and the second evaluation function, the first evaluation function causing the evaluation value to decrease as a difference between a recognition result from the recognition unit and training data decreases, the second evaluation function causing the evaluation value to decrease as a difference between the intermediate outputs corresponding to the actual image and the CG image decreases.

According to this embodiment, in a case where a learning model that outputs an inference result with respect to an input image is used, the robustness of an inference result with respect to an actual image can be increased even in a case where a CG image is used as learning data.

2. In the information processing apparatus according to the foregoing embodiment,
   the processing unit causes the neural network to perform learning with use of an evaluation value obtained as a weighted sum of the evaluation value based on the first evaluation function and the evaluation value based on the second evaluation function (e.g., step S510, expression (3)).

This embodiment enables learning that takes into consideration balance between the evaluation value based on the first evaluation function and the evaluation value based on the second evaluation function.

3. In the information processing apparatus according to the foregoing embodiment,
   the processing unit causes the neural network to perform learning by changing weights for the evaluation value based on the first evaluation function and the evaluation value based on the second evaluation function in accordance with a progress of learning of the neural network (e.g., step S510, expression (3)).

This embodiment enables control whereby learning is performed by preferentially using one of the evaluation values in accordance with the progress of learning.

4. In the information processing apparatus according to the foregoing embodiment,
   the processing unit changes a weighting coefficient for a predetermined layer of the neural network in accordance with the evaluation values based on the first evaluation function and the second evaluation function (e.g., 341), and changes a weighting coefficient for a layer other than the predetermined layer in the neural network in accordance with the evaluation value based on the first evaluation function (e.g., 340).

According to this embodiment, the difference between the intermediate outputs corresponding to the actual image and the CG image can be reflected in a weighting coefficient for a highly relevant layer (without cancelling out a change in a weighting coefficient from an output layer).

5. In the information processing apparatus according to the foregoing embodiment,
   the predetermined layer is composed of one or more layers that are included in a plurality of hidden layers of the neural network.

This embodiment can reduce the amount of memory usage and improve the processing speed by performing processing based on the second evaluation function only with respect to specific hidden layers.

6. In the information processing apparatus according to the foregoing embodiment,
   the processing unit calculates the evaluation value based on the second evaluation function in accordance with a difference between a predetermined characteristic amount of an image represented by the intermediate output corresponding to the actual image and a predetermined characteristic amount of an image represented by the intermediate output corresponding to the CG image (e.g., 326, 327).

According to this embodiment, an evaluation function based on the characteristics of the actual image and the CG image can be used.

7. In the information processing apparatus according to the foregoing embodiment,
   the predetermined characteristic amounts include at least one of a position, a region size, a variation amount, and a variation cycle of a low-frequency component at or below a predetermined value of luminance or RGB values within the images, and an appearance frequency of a high-frequency component at or above a predetermined value of luminance or RGB values within the images.

According to this embodiment, the difference between a low-frequency component and a high-frequency component easily appears in the actual image and the CG image, and thus an evaluation function that reflects the characteristics of this difference can be used.

8. The information processing apparatus according to the foregoing embodiment further includes:

a communication unit configured to receive, from an external apparatus, the training data and the CG image showing the scene similar to the actual image.

According to this embodiment, in the realization of learning of the neural network within the information processing apparatus, accumulation of learning data is facilitated unlike a case where learning data is generated within the self-apparatus.

9. A vehicle (100) according to the foregoing embodiments includes:

the information processing apparatus according to any one of claims 1 to 8.

This embodiment can realize, on the vehicle, recognition of a target within the actual image with use of the neural network and learning of this neural network, and can also increase the robustness of the inference result with respect to the actual image even in a case where the CG image is used as learning data.

10. A vehicle (e.g., 100) according to the foregoing embodiments is a vehicle (e.g., 100) comprising:
an image capturing unit (e.g., 101);
one or more processors; and
a memory storing instructions which, when the instructions are executed by the one or more processors, cause the vehicle to function as:
a recognition unit (e.g., 214) configured to recognize a target within an actual image shot by the image capturing device by executing processing of a neural network (e.g., 314) including a hidden layer,
wherein the neural network is provided by an information processing server (e.g., 700) that includes a processing device (e.g., 710, 714) configured to cause the neural network to perform learning by changing weighting coefficients for the neural network so that evaluation values based on a first evaluation function and a second evaluation function decrease,
the information processing server causes the processing device to obtain intermediate outputs (e.g., 322 to 325) which correspond to the actual image and a computer graphics (CG) image and which are from the hidden layer of the neural network when each of the actual image and the CG image has been separately input to the neural network, the CG image showing a scene similar to the actual image, and
the processing device causes the neural network to perform learning with use of the evaluation values based on the first evaluation function and the second evaluation function, the first evaluation function causing the evaluation value to decrease as a difference between a recognition result from the recognition unit and training data decreases, the second evaluation function causing the evaluation value to decrease as a difference between the intermediate outputs corresponding to the actual image and the CG image decreases.

According to this embodiment, the vehicle can use the neural network that has performed learning on the information processing server, and furthermore, this neural network can increase the robustness of the inference result with respect to the actual image even in a case where the CG image is used as learning data.

11. An information processing server (e.g., 700) according to the foregoing embodiments includes:

one or more processors; and
a memory storing instructions which, when the instructions are executed by the one or more processors, cause the information processing server to function as:
an obtainment unit (e.g., 713) configured to obtain, from an external information processing apparatus (e.g., 100), an actual image shot by an image capturing device (e.g., 101) included in the external information processing apparatus;
a recognition unit (e.g., 714) configured to recognize a target within the actual image by executing processing of a neural network that includes a hidden layer; and
a processing unit (e.g., 714) configured to cause the neural network to perform learning by changing weighting coefficients for the neural network so that evaluation values based on a first evaluation function and a second evaluation function decrease,
wherein the processing unit obtains intermediate outputs (e.g., 322 to 325) which correspond to the actual image and a computer graphics (CG) image and which are from the hidden layer of the neural network when each of the actual image and the CG image has been separately input to the neural network, the CG image showing a scene similar to the actual image, and
the processing unit causes the neural network to perform learning with use of the evaluation values based on the first evaluation function and the second evaluation function, the first evaluation function causing the evaluation value to decrease as a difference between a recognition result from the recognition unit and training data decreases, the second evaluation function causing the evaluation value to decrease as a difference between the intermediate outputs corresponding to the actual image and the CG image decreases.

The invention is not limited to the foregoing embodiments, and various variations/changes are possible within the spirit of the invention.

What is claimed is:

1. An information processing apparatus comprising:
one or more processors; and
a memory storing instructions which, when the instructions are executed by the one or more processors, cause the information processing apparatus to function as:
an obtainment unit configured to obtain an actual image shot by an image capturing device;
a recognition unit configured to recognize a target within the actual image by executing processing of a neural network that includes a hidden layer; and
a processing unit configured to cause the neural network to perform learning by changing weighting coefficients for the neural network so that evaluation values based on a first evaluation function and a second evaluation function decrease,
wherein the processing unit obtains intermediate outputs which correspond to the actual image and a computer graphics (CG) image and which are from the hidden layer of the neural network when each of the actual image and the CG image has been separately input to the neural network, the CG image showing a scene similar to the actual image, and
the processing unit causes the neural network to perform learning with use of the evaluation values based on the first evaluation function and the second evaluation function, the first evaluation function causing the evaluation value to decrease as a difference between a recognition result from the recognition unit and training data decreases, the second evaluation function causing the evaluation value to decrease as a difference between the intermediate outputs corresponding to the actual image and the CG image decreases.

2. The information processing apparatus according to claim 1,
wherein the processing unit causes the neural network to perform learning with use of an evaluation value obtained as a weighted sum of the evaluation value based on the first evaluation function and the evaluation value based on the second evaluation function.

3. The information processing apparatus according to claim 2,
wherein the processing unit causes the neural network to perform learning by changing weights for the evaluation value based on the first evaluation function and the evaluation value based on the second evaluation function in accordance with a progress of learning of the neural network.

4. The information processing apparatus according to claim 1,
wherein the processing unit changes a weighting coefficient for a predetermined layer of the neural network in accordance with the evaluation values based on the first evaluation function and the second evaluation function, and changes a weighting coefficient for a layer other than the predetermined layer in the neural network in accordance with the evaluation value based on the first evaluation function.

5. The information processing apparatus according to claim 4,
wherein the predetermined layer is composed of one or more layers that are included in a plurality of hidden layers of the neural network.

6. The information processing apparatus according to claim 1,
wherein the processing unit calculates the evaluation value based on the second evaluation function in accordance with a difference between a predetermined characteristic amount of an image represented by the intermediate output corresponding to the actual image and a predetermined characteristic amount of an image represented by the intermediate output corresponding to the CG image.

7. The information processing apparatus according to claim 6,
wherein the predetermined characteristic amounts include at least one of a position, a region size, a variation amount, and a variation cycle of a low-frequency component at or below a predetermined value of luminance or RGB values within the images, and an appearance frequency of a high-frequency component at or above a predetermined value of luminance or RGB values within the images.

8. The information processing apparatus according to claim 1 further comprising:
a communication device configured to receive, from an external apparatus, the training data and the CG image showing the scene similar to the actual image.

9. A vehicle including an information processing apparatus,
the information processing apparatus including:
one or more processors; and
a memory storing instructions which, when the instructions are executed by the one or more processors, cause the information processing apparatus to function as:
an obtainment unit configured to obtain an actual image shot by an image capturing device;
a recognition unit configured to recognize a target within the actual image by executing processing of a neural network that includes a hidden layer; and
a processing unit configured to cause the neural network to perform learning by changing weighting coefficients for the neural network so that evaluation values based on a first evaluation function and a second evaluation function decrease,
wherein the processing unit obtains intermediate outputs which correspond to the actual image and a computer graphics (CG) image and which are from the hidden layer of the neural network when each of the actual image and the CG image has been separately input to the neural network, the CG image showing a scene similar to the actual image, and
the processing unit causes the neural network to perform learning with use of the evaluation values based on the first evaluation function and the second evaluation function, the first evaluation function causing the evaluation value to decrease as a difference between a recognition result from the recognition unit and training data decreases, the second evaluation function causing the evaluation value to decrease as a difference between the intermediate outputs corresponding to the actual image and the CG image decreases.

10. A vehicle comprising:
an image capturing device;
one or more processors; and
a memory storing instructions which, when the instructions are executed by the one or more processors, cause the vehicle to function as:
a recognition unit configured to recognize a target within an actual image shot by the image capturing device by executing processing of a neural network including a hidden layer,
wherein the neural network is provided by an information processing server that includes a processing device configured to cause the neural network to perform learning by changing weighting coefficients for the neural network so that evaluation values based on a first evaluation function and a second evaluation function decrease,
the information processing server causes the processing device to obtain intermediate outputs which correspond to the actual image and a computer graphics (CG) image and which are from the hidden layer of the neural network when each of the actual image and the CG image has been separately input to the neural network, the CG image showing a scene similar to the actual image, and
the processing device causes the neural network to perform learning with use of the evaluation values based on the first evaluation function and the second evaluation function, the first evaluation function causing the evaluation value to decrease as a difference between a recognition result from the recognition unit and training data decreases, the second evaluation function causing the evaluation value to decrease as a difference between the intermediate outputs corresponding to the actual image and the CG image decreases.

11. An information processing server comprising:
one or more processors; and
a memory storing instructions which, when the instructions are executed by the one or more processors, cause the information processing server to function as:
an obtainment unit configured to obtain, from an external information processing apparatus, an actual image shot by an image capturing device included in the external information processing apparatus;

a recognition unit configured to recognize a target within the actual image by executing processing of a neural network that includes a hidden layer; and a processing unit configured to cause the neural network to perform learning by changing weighting coefficients for the neural network so that evaluation values based on a first evaluation function and a second evaluation function decrease, wherein the processing unit obtains intermediate outputs which correspond to the actual image and a computer graphics (CG) image and which are from the hidden layer of the neural network when each of the actual image and the CG image has been separately input to the neural network, the CG image showing a scene similar to the actual image, and the processing unit causes the neural network to perform learning with use of the evaluation values based on the first evaluation function and the second evaluation function, the first evaluation function causing the evaluation value to decrease as a difference between a recognition result from the recognition unit and training data decreases, the second evaluation function causing the evaluation value to decrease as a difference between the intermediate outputs corresponding to the actual image and the CG image decreases.

12. An information processing method that is executed by an information processing apparatus comprising: one or more processors; and a memory storing instructions which, when the instructions are executed by the one or more processors, cause the information processing apparatus to function as: an obtainment unit configured to obtain an actual image shot by an image capturing unit; a recognition unit configured to recognize a target within the actual image by executing processing of a neural network that includes a hidden layer; and a processing unit, the information processing method comprising:

causing the neural network to perform learning by changing weighting coefficients for the neural network so that evaluation values based on a first evaluation function and a second evaluation function decrease, wherein, in the causing, intermediate outputs are obtained which correspond to the actual image and a computer graphics (CG) image and which are from the hidden layer of the neural network when each of the actual image and the CG image has been separately input to the neural network, the CG image showing a scene similar to the actual image, and in the causing, the neural network is caused to perform learning with use of the evaluation values based on the first evaluation function and the second evaluation function, the first evaluation function causing the evaluation value to decrease as a difference between a recognition result from the recognition unit and training data decreases, the second evaluation function causing the evaluation value to decrease as a difference between the intermediate outputs corresponding to the actual image and the CG image decreases.

13. An information processing method that is executed by an information processing server comprising: one or more processors; and a memory storing instructions which, when the instructions are executed by the one or more processors, cause the information processing server to function as: an obtainment unit configured to obtain, from an external information processing apparatus, an actual image shot by an image capturing device included in the external information processing apparatus; a recognition unit configured to recognize a target within the actual image by executing processing of a neural network that includes a hidden layer; and a processing unit, the information processing method comprising:

causing the neural network to perform learning by changing weighting coefficients for the neural network so that evaluation values based on a first evaluation function and a second evaluation function decrease, wherein, in the causing, intermediate outputs are obtained which correspond to the actual image and a computer graphics (CG) image and which are from the hidden layer of the neural network when each of the actual image and the CG image has been separately input to the neural network, the CG image showing a scene similar to the actual image, and in the causing, the neural network is caused to perform learning with use of the evaluation values based on the first evaluation function and the second evaluation function, the first evaluation function causing the evaluation value to decrease as a difference between a recognition result from the recognition unit and training data decreases, the second evaluation function causing the evaluation value to decrease as a difference between the intermediate outputs corresponding to the actual image and the CG image decreases.

14. A non-transitory computer-readable storage medium storing instructions for causing a computer to function as each unit of an image processing apparatus, the image processing apparatus including:

one or more processors; and a memory storing instructions which, when the instructions are executed by the one or more processors, cause the information processing apparatus to function as:

an obtainment unit configured to obtain an actual image shot by an image capturing device;

a recognition unit configured to recognize a target within the actual image by executing processing of a neural network that includes a hidden layer; and a processing unit configured to cause the neural network to perform learning by changing weighting coefficients for the neural network so that evaluation values based on a first evaluation function and a second evaluation function decrease, wherein the processing unit obtains intermediate outputs which correspond to the actual image and a computer graphics (CG) image and which are from the hidden layer of the neural network when each of the actual image and the CG image has been separately input to the neural network, the CG image showing a scene similar to the actual image, and the processing unit causes the neural network to perform learning with use of the evaluation values based on the first evaluation function and the second evaluation function, the first evaluation function causing the evaluation value to decrease as a difference between a recognition result from the recognition unit and training data decreases, the second evaluation function causing the evaluation value to decrease as a difference between the intermediate outputs corresponding to the actual image and the CG image decreases.

* * * * *